United States Patent
Kim (10) Patent No.: US 10,933,861 B2
(45) Date of Patent: Mar. 2, 2021

(54) METHOD FOR CONTROLLING DRIVING OF HYBRID VEHICLE USING DYNAMIC TRAFFIC INFORMATION

(71) Applicants: Hyundai Motor Company, Seoul (KR); Kia Motors Corporation, Seoul (KR)

(72) Inventor: Do Hee Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 306 days.

(21) Appl. No.: 16/101,486

(22) Filed: Aug. 12, 2018

(65) Prior Publication Data
US 2019/0184976 A1 Jun. 20, 2019

(30) Foreign Application Priority Data
Dec. 18, 2017 (KR) .................. 10-2017-0174089

(51) Int. Cl.
*B60W 20/20* (2016.01)
*B60W 50/00* (2006.01)

(52) U.S. Cl.
CPC ......... *B60W 20/20* (2013.01); *B60W 50/0097* (2013.01); *B60W 2554/00* (2020.02); *B60Y 2200/92* (2013.01)

(58) Field of Classification Search
CPC .............. B60Y 2200/92; B60W 20/20; B60W 2555/60; B60W 30/182; B60W 20/12; B60W 50/0097
See application file for complete search history.

(56) References Cited

U.S. PATENT DOCUMENTS

| | | | | |
|---|---|---|---|---|
| 5,566,072 A * | 10/1996 | Momose | ............... | B60W 40/04 701/117 |
| 6,989,766 B2 * | 1/2006 | Mese | ............... | G08G 1/096716 340/907 |
| 7,825,825 B2 | 11/2010 | Park | | |
| 9,070,305 B1 | 6/2015 | Raman et al. | | |
| 9,725,083 B2 * | 8/2017 | Dextreit | ............... | B60W 10/06 |
| 10,703,353 B2 * | 7/2020 | Kim | ..................... | B60W 20/10 |
| 2007/0199745 A1 * | 8/2007 | Hayashi | ............... | B60L 15/2054 180/65.28 |
| 2009/0150314 A1 * | 6/2009 | Engstrom | ............ | G05B 13/027 706/21 |
| 2010/0312427 A1 * | 12/2010 | Ueno | ................... | B60W 10/115 701/22 |
| 2011/0224893 A1 * | 9/2011 | Scofield | ................ | G08G 1/052 701/119 |
| 2012/0199437 A1 * | 8/2012 | Okuda | ..................... | B60K 6/48 192/85.63 |

(Continued)

*Primary Examiner* — Mussa A Shaawat
(74) *Attorney, Agent, or Firm* — Mintz Levin Cohn Ferris Glovsky and Popeo, P.C.; Peter F. Corless (57) ABSTRACT

A method for controlling driving of a hybrid vehicle using dynamic traffic information includes: determining whether the hybrid vehicle passes through a traffic light based on the dynamic traffic information including traffic light information and traffic situation information, and determining a driving mode of the hybrid vehicle that is used on a road disposed between the hybrid vehicle and the traffic light based on whether the hybrid vehicle passes through the traffic light.

9 Claims, 8 Drawing Sheets

(56) References Cited

U.S. PATENT DOCUMENTS

| | | | | |
|---|---|---|---|---|
| 2013/0124026 A1* | 5/2013 | Ueno | ...................... | B60K 6/48 |
| | | | | 701/22 |
| 2013/0297124 A1* | 11/2013 | Be | ...................... | B60W 10/02 |
| | | | | 701/22 |
| 2014/0046525 A1* | 2/2014 | Lee | ...................... | B60W 10/11 |
| | | | | 701/22 |
| 2014/0100730 A1* | 4/2014 | Park | ...................... | B60W 10/06 |
| | | | | 701/22 |
| 2014/0172282 A1* | 6/2014 | Feng | ...................... | B60L 58/12 |
| | | | | 701/117 |
| 2015/0314776 A1* | 11/2015 | Yu | ...................... | B60W 20/40 |
| | | | | 701/22 |
| 2015/0314778 A1* | 11/2015 | Matsui | .................. | B60W 20/40 |
| | | | | 701/22 |
| 2016/0185337 A1* | 6/2016 | Morita | .................... | B60K 6/48 |
| | | | | 701/22 |
| 2016/0280213 A1* | 9/2016 | Lian | ...................... | B60W 20/40 |
| 2016/0368479 A1* | 12/2016 | Kim | .................... | B60W 10/06 |
| 2017/0028978 A1* | 2/2017 | Dunlap | ................ | B60W 10/08 |
| 2017/0096134 A1* | 4/2017 | Yoon | .................... | B60K 6/547 |
| 2017/0129359 A1* | 5/2017 | Dunlap | .................... | B60L 1/02 |
| 2017/0182998 A1* | 6/2017 | Hatsuda | ............... | B60W 20/12 |
| 2018/0265069 A1* | 9/2018 | Wiesbeck | ............... | B60K 6/20 |

* cited by examiner

METHOD FOR CONTROLLING DRIVING OF HYBRID VEHICLE USING DYNAMIC TRAFFIC INFORMATION

CROSS-REFERENCE TO RELATED APPLICATION

This application claims under 35 U.S.C. § 119(a) the benefit of Korean Patent Application No. 10-2017-0174089 filed in the Korean Intellectual Property Office on Dec. 18, 2017, the entire contents of which are incorporated herein by reference.

BACKGROUND

(a) Technical Field

The present disclosure relates to a control method for a vehicle, and more particularly, to a method for controlling driving of a hybrid vehicle using dynamic traffic information.

(b) Description of the Related Art

An environmentally-friendly vehicle includes a fuel cell vehicle, an electric vehicle, a plug-in electric vehicle, and a hybrid vehicle, and typically includes a motor to generate driving force.

The hybrid vehicle, which is an example of the environmentally-friendly vehicle, uses an internal combustion engine and a battery together. In other words, the hybrid vehicle efficiently combines and uses power of the internal combustion engine and power of a motor (i.e., stored in the battery).

The hybrid vehicle can include an engine (e.g., the internal combustion engine), the motor, an engine clutch to adjust power between the engine and the motor, a transmission, a differential gear apparatus, the battery, a starter-generator that starts the engine or generates electricity by output of the engine, and wheels.

Further, the hybrid vehicle can include a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery.

The battery control unit can be referred to as a battery management system (BMS). The starter-generator can be referred to as an integrated starter and generator (ISG) or a hybrid starter and generator (HSG).

The hybrid vehicle can be driven in a driving mode, such as an electric vehicle (EV) mode, which is an electric vehicle mode using only power of the motor, a hybrid electric vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery.

U.S. Pat. No. 9,070,305, which is related art, describes a method of calculating position information of a traffic light by detecting information (e.g., a position, a direction, and a height) of a vehicle and information of the traffic light as an image and a color.

U.S. Pat. No. 7,825,825, which is related art, describes a method of providing traffic light information to a vehicle.

The above information disclosed in this Background section is only for enhancement of understanding of the background of the disclosure and therefore it may contain information that does not form the prior art that is already known in this country to a person of ordinary skill in the art.

SUMMARY

The present disclosure provides a method for controlling driving of a hybrid vehicle using dynamic traffic information which is capable of predicting a forward driving situation of the vehicle using the dynamic traffic information (e.g., traffic light information or traffic situation information) on a road or a route and determining a driving mode of the vehicle and correcting or adjusting a transition reference value of the vehicle between possible driving modes of the vehicle based on the prediction result.

An exemplary embodiment of the present disclosure provides the method for controlling driving of the hybrid vehicle using the dynamic traffic information, including: determining, by a controller, whether the hybrid vehicle passes through a traffic light based on the dynamic traffic information including traffic light information and traffic situation information; and determining, by the controller, a driving mode of the hybrid vehicle that is used on a road disposed between the hybrid vehicle and the traffic light based on whether the hybrid vehicle passes through the traffic light.

Determining the driving mode of the hybrid vehicle may include: correcting, by the controller, a transition reference value between possible driving modes of the hybrid vehicle so that the hybrid vehicle maintains to travel in an electric vehicle mode when it is determined that the hybrid vehicle does not pass through the traffic light.

Determining the driving mode of the hybrid vehicle may include: determining, by the controller, the driving mode of the hybrid vehicle based on a transition reference value between an electric vehicle mode and a hybrid electric vehicle mode when it is determined that the hybrid vehicle passes through the traffic light. The transition reference value may be determined based on static traffic information, driving demand power of the hybrid vehicle, and a state of charge of a battery included in the hybrid vehicle.

Correcting the transition reference value between the possible driving modes of the hybrid vehicle so that the hybrid vehicle maintains to travel in the electric vehicle mode may include: determining, by the controller, a target speed profile of the hybrid vehicle based on a current speed of the hybrid vehicle, a target speed required when the hybrid vehicle does not pass through the traffic light, the traffic light information, the traffic situation information, and position information of the hybrid vehicle; determining, by the controller, the driving demand power of the hybrid vehicle based on the target speed profile and a driving load of the hybrid vehicle; and correcting, by the controller, the transition reference value between the possible driving modes of the hybrid vehicle as a value greater than the transition reference value between the possible driving modes determined based on the driving demand power.

Correcting the transition reference value between the possible driving modes of the hybrid vehicle so that the hybrid vehicle maintains to travel in the electric vehicle mode may include: adjusting, by the controller, the corrected transition reference value based on a state of charge of a battery supplying electric power to a driving motor of the hybrid vehicle.

The adjusted value of the transition reference value when the state of charge of the battery is equal to or greater than a reference value may be greater than the adjusted value of the transition reference value when the state of charge of the battery is less than the reference value.

The traffic light information may include a red signal time and a green signal time, and the traffic situation information may include an expected average speed of the hybrid vehicle in a road section including the traffic light.

Determining whether the hybrid vehicle passes through the traffic light may include: determining, by the controller, whether a current signal of the traffic light is a red signal and a red signal remaining time is greater than or equal to a remaining time in which the hybrid vehicle reaches the traffic light. The controller may determine the red signal remaining time and the remaining time based on the traffic light information, the traffic situation information, and position information of the hybrid vehicle. When the red signal remaining time is greater than or equal to the remaining time, it may be determined that the hybrid vehicle does not pass through the traffic light.

Determining whether the hybrid vehicle passes through the traffic light may include: determining, by the controller, whether a current signal of the traffic light is a green signal and a remaining time in which the hybrid vehicle reaches the traffic light exceeds a green signal remaining time. The controller may determine the green signal remaining time and the remaining time based on the traffic light information, the traffic situation information, and position information of the hybrid vehicle. When the remaining time is greater than or equal to the green signal remaining time, it may be determined that the hybrid vehicle does not pass through the traffic light.

The method for controlling driving of the hybrid vehicle using the dynamic traffic information according to the exemplary embodiment of the present disclosure may reduce energy consumption of the vehicle due to unnecessary transition between an on state and an off state of an engine by determining the driving mode using the dynamic traffic information, thereby improving fuel efficiency or fuel economy of the vehicle on a real road.

A non-transitory computer readable medium containing program instructions executed by a processor can include: program instructions that determine whether a hybrid vehicle passes through a traffic light based on dynamic traffic information including traffic light information and traffic situation information; and program instructions that determine a driving mode of the hybrid vehicle that is used on a road disposed between the hybrid vehicle and the traffic light based on whether the hybrid vehicle passes through the traffic light.

BRIEF DESCRIPTION OF THE DRAWINGS

A brief description of the drawings will be provided to more sufficiently understand the drawings which are used in the detailed description of the present disclosure.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to sufficiently understand the present disclosure and the object achieved by embodying the present disclosure, the accompanying drawings illustrating exemplary embodiments of the present disclosure and contents described in the accompanying drawings are to be referenced.

Hereinafter, the present disclosure will be described in detail by describing exemplary embodiments of the present disclosure with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

Information that is used to minimize energy consumption of the vehicle while the vehicle is traveling on the road may be largely classified into static information and dynamic information. The static information may include a high precision map including a road gradient, a road curvature, toll gate position, or interchange (IC) position. The dynamic information may include vehicle-to-everything (V2X) information including traffic light information or road congestion information.

The static information may be calculated before a departure of the vehicle when destination and route of the vehicle are determined. However, the dynamic information may change every moment and driving profile of the vehicle may be susceptible to propensity of a driver of the vehicle or an unexpected situation so that it is very difficult to predict the driving profile of the vehicle. Accordingly, if the dynamic information on a road is updated at an appropriate time, a driving situation of the vehicle for a certain period may be predicted. A control using the predicted driving situation to transition a driving mode of the vehicle, which minimizes energy consumption of the vehicle, may be possible.

A related art has used an energy reduction method that uses a piece of the dynamic traffic information including traffic light information or traffic congestion information to provide a driving guide to a driver of a vehicle, so as to prevent the driver from generating additional driving energy. An environmentally-friendly vehicle with a motor may flexibly adjust a driving power, and a hybrid vehicle may determine a driving mode using an engine and a motor. Thus, the vehicle may use the control using the predicted driving situation.

Figure 1:
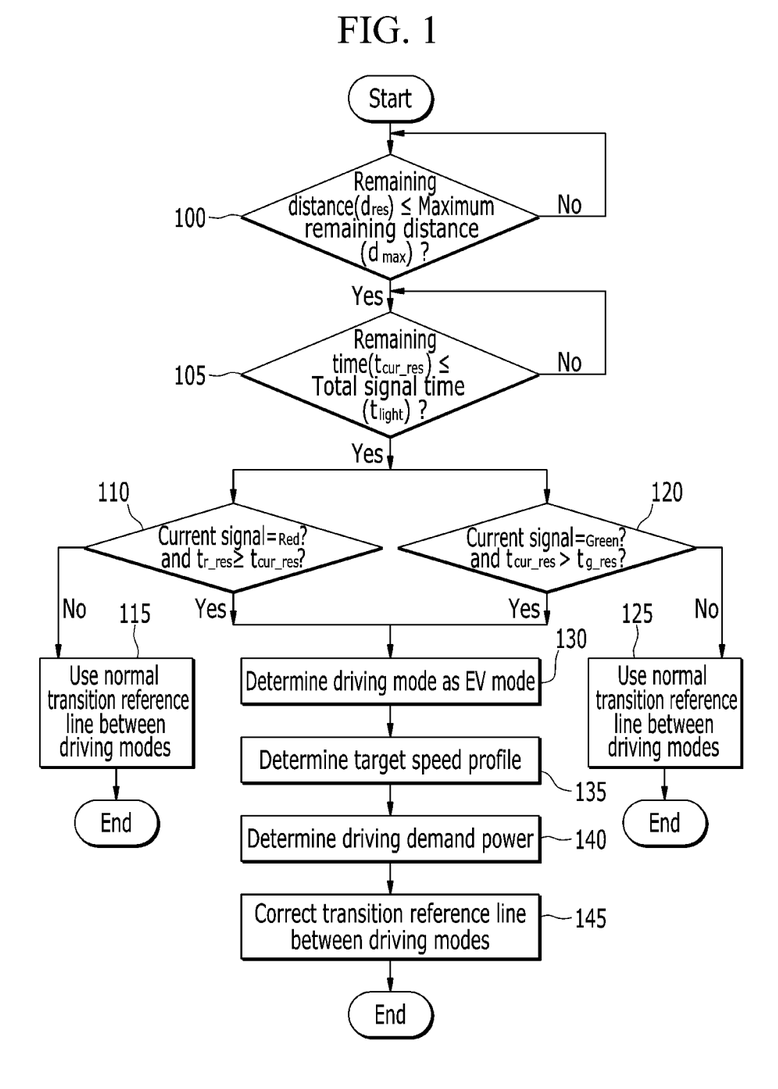
FIG. 1 is a flowchart illustrating a method for controlling driving of a hybrid vehicle using dynamic traffic information.
Figure 2:
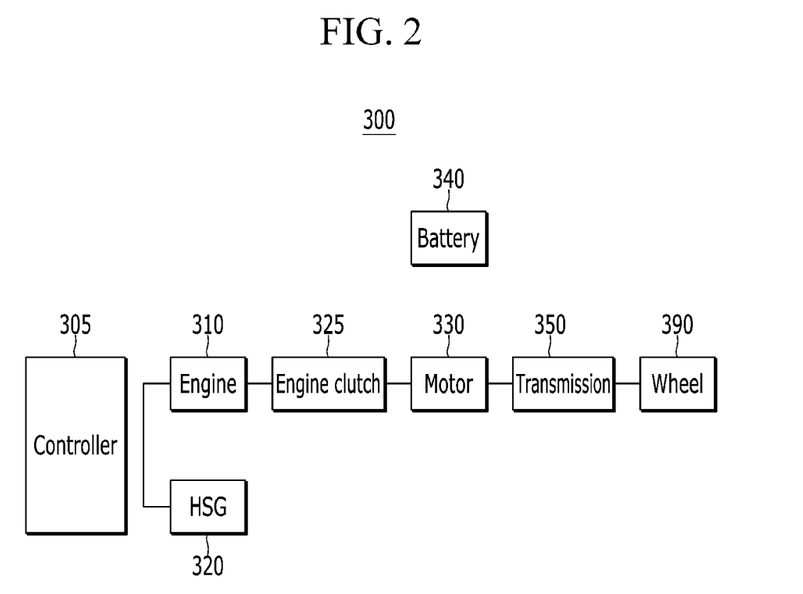
FIG. 2 is a block diagram illustrating a hybrid vehicle to which the method for controlling driving of the hybrid vehicle according to the exemplary embodiment of the present disclosure is applied.
Figure 3:
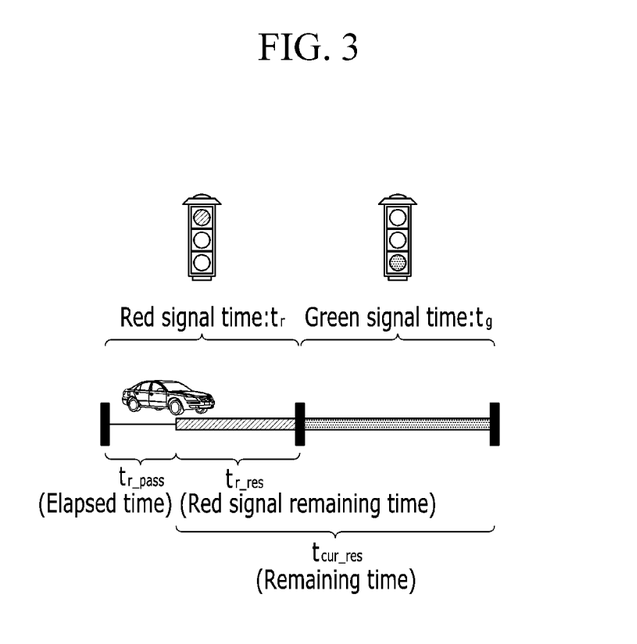
FIG. 3 is a view explaining an exemplary embodiment of a method for determining whether the hybrid vehicle passes through a traffic light near the vehicle when the current signal of a traffic light shown in FIG. 1 is a red signal.
Figure 4:
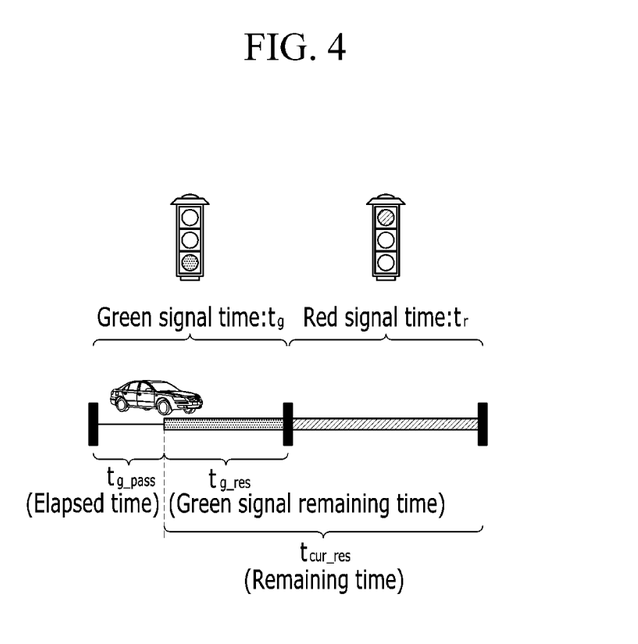
FIG. 4 is a view explaining an exemplary embodiment of a method for determining whether the hybrid vehicle passes through a traffic light near the vehicle when the current signal of a traffic light shown in FIG. 1 is a green signal.
Figure 5:
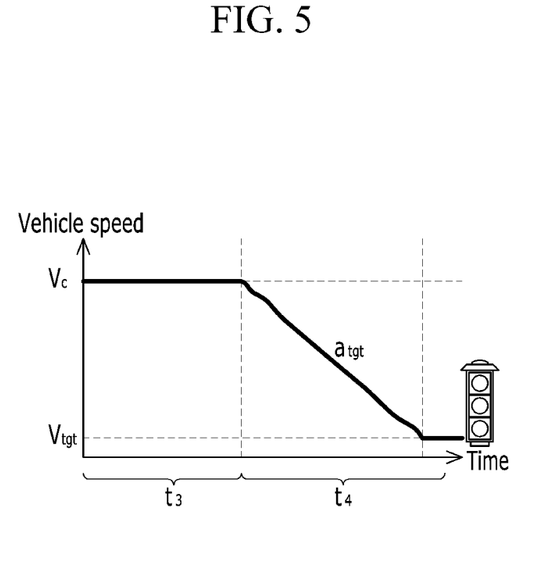
FIGS. 5 and 6 are views for explaining a step of determining the target speed profile shown in FIG. 1.
Figure 6:
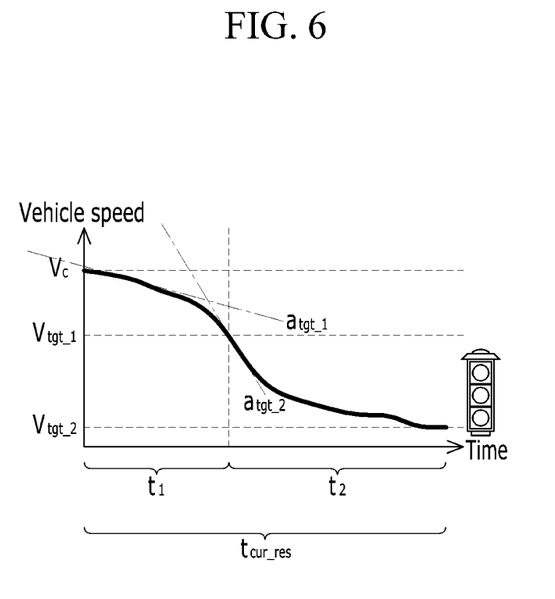
Figure 7:
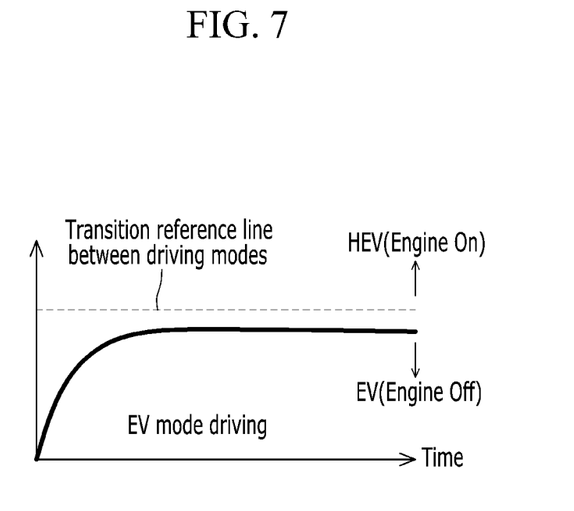
FIGS. 7 and 8 are views explaining a step of correcting the transition reference value between driving modes shown in FIG. 1.
Figure 8:
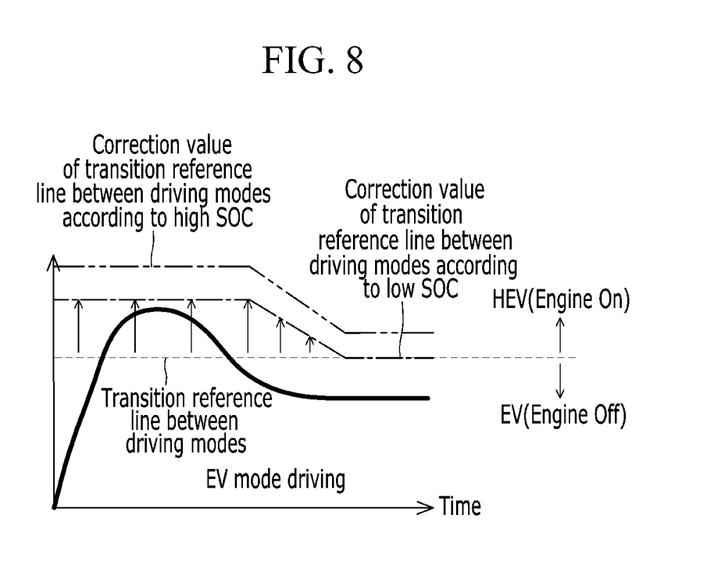

FIG. 1 is a flowchart illustrating a method for controlling driving of a hybrid vehicle using dynamic traffic information. FIG. 2 is a block diagram illustrating a hybrid vehicle to which the method for controlling driving of the hybrid vehicle according to the exemplary embodiment of the present disclosure is applied. FIG. 3 is a view explaining an exemplary embodiment of a method for determining whether the hybrid vehicle passes through a traffic light near the vehicle when the current signal of a traffic light shown in FIG. 1 is a red signal. FIG. 4 is a view explaining an exemplary embodiment of a method for determining whether the hybrid vehicle passes through a traffic light near the vehicle when the current signal of a traffic light shown in FIG. 1 is a green signal. FIGS. 5 and 6 are views for explaining a step of determining the target speed profile shown in FIG. 1. FIGS. 7 and 8 are views explaining a step of correcting the transition reference value between driving modes (i.e., possible driving modes of the hybrid vehicle) shown in FIG. 1.

Referring to FIGS. 1-8, in a determination step 100, a controller 305 included in the hybrid vehicle 300 may determine whether a remaining distance (or a current remaining distance) $d_{res}$ up to a traffic light which the hybrid vehicle will approach is less than or equal to a maximum remaining distance $d_{max}$.

The maximum remaining distance $d_{max}$ may be a product of a maximum vehicle speed $V_{max\_section}$ in each road section and a total signal time $t_{light}$. The maximum speed of the vehicle in each road section may be traffic situation information. The total signal time $t_{light}$ that is the traffic light information may be a value obtained by adding a red signal time $t_r$ to a green signal time $t_g$. Based on the traffic situation information, it may be determined whether a yellow signal time is included in the red signal time $t_r$ or in the green signal time $t_g$. For example, the yellow signal time may be included in the green signal time $t_g$ when the vehicle traffic flow is determined to be smooth based on the traffic situation information, and the yellow signal time may be included in the red signal time $t_r$ when the vehicle traffic flow is determined not to be smooth based on the traffic situation information. For safety purposes, the yellow signal time may always be included in the red signal time $t_r$. The traffic situation information and the traffic light information may be provided to the controller 305 by a server installed outside the hybrid vehicle 300.

The controller 305 may calculate the remaining distance based on position information of the traffic light, which is the traffic light information, and position information of the vehicle generated by a global positioning system (GPS) receiver of the hybrid vehicle 300.

For example, the controller 305 may be one or more microprocessors operated by a program or hardware including the microprocessor. The program may include a series of commands for executing the method for controlling driving of the hybrid vehicle using the dynamic traffic information according to the exemplary embodiment of the present disclosure. The commands may be stored in a memory.

The hybrid vehicle 300 includes the controller 305, an engine 310, a hybrid starter-generator (HSG) 320, an engine clutch 325, a motor (or a driving motor) 330 which may be an electric motor, a battery 340, a transmission 350, and wheels (or driving wheels) 390.

The hybrid vehicle 300, which is a hybrid electric vehicle, may use the engine 310 and the motor 330 as power sources, and includes the engine clutch 325 existing between the engine 310 and the motor 330 so that the hybrid vehicle 300 may be operated in an electric vehicle (EV) mode in which the hybrid vehicle 300 travels by the motor 330 in a state where the engine clutch 325 is opened, and in a hybrid electric vehicle (HEV) mode in which the hybrid vehicle 300 is capable of travelling by both the motor 330 and the engine 310 in a state where the engine clutch 325 is closed.

The hybrid vehicle 300 may include a power train of a transmission mounted electric device (TMED) type in which the motor 330 is connected to the transmission 350. The hybrid vehicle 300 may provide a driving mode, such as the EV mode, which is the electric vehicle mode using only power of the motor, and the HEV mode, which uses rotational force of the engine as main power and uses rotational force of the motor as auxiliary power depending on whether the engine clutch 325 that is disposed between the engine 310 and the motor 330 is engaged (or connected). In particular, in the hybrid vehicle 300 including a structure in which the motor 330 may be directly connected to the transmission 350, revolutions per minute (RPM) of the engine may be increased by drive of the HSG 320, power delivery and power cutoff between the engine and the motor may be performed via engagement and release of the clutch 325, a driving force may be transmitted (or transferred) to the wheels 390 through a power transmission system which may include the transmission 350, and torque of the engine may be transmitted to the motor via engagement of the clutch 325 when transmission of the engine torque is requested.

The controller 305 may include a hybrid control unit (HCU), a motor control unit (MCU), an engine control unit (ECU), and a transmission control unit (TCU).

The HCU may control starting of the engine 310 by controlling the HSG 320 when the engine stops. The HCU may be the highest controller, and may synthetically control controllers (for example, the MCU) connected to a network such as a controller area network (CAN) which is a vehicle network, and may control overall operation of the hybrid vehicle 300.

The MCU may control the HSG 320 and the motor 330. The MCU may control an output torque of the driving motor 330 through the network depending on the control signal output from the HCU, and thus may control the motor to operate at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter converts a direct current (DC) voltage that is supplied from the battery 340 into a three-phase alternating current (AC) voltage to drive the driving motor 330. The MCU may be disposed between the battery 340 and the motor 330.

The ECU may control a torque of the engine 310. The ECU may control an operating point (or a driving point) of the engine 310 through the network depending on a control signal output from the HCU, and may control the engine to output an optimal torque. The TCU may control an operation of the transmission 350.

The engine 310 may include a diesel engine, a gasoline engine, a liquefied natural gas (LNG) engine, or a liquefied petroleum gas (LPG) engine, and may output a torque at the operating point depending on a control signal output from the ECU. The torque may be combined with driving force of the driving motor 330 in the HEV mode.

The engine 310 may be connected to the motor 330 via the engine clutch 325 to generate a power transmitted to the transmission 350.

The HSG 320 may operate as a motor depending on a control signal output from the MCU to start the engine 310, and may operate as a generator in a state in which start of the engine 310 is maintained to provide generated electric power to the battery 340 via the inverter. The HSG 320 may be connected to the engine 310 through a belt. The HSG 320, which is a motor that cranks the engine, may be directly connected to the engine.

The engine clutch 325 may be disposed (or mounted) between the engine 310 and the driving motor 330, and may be operated to switch power delivery between the engine 310 and the motor 330. The engine clutch 325 may connect or intercept power between the engine and the motor depending on switching of the HEV mode and the EV mode. Operation of the engine clutch 325 may be controlled by the controller 305.

The motor 330 may be operated by a three-phase AC voltage that is output from the MCU to generate a torque. The motor 330 may be operated as a generator during coasting drive or regenerative braking to supply a voltage (or regenerative energy) to the battery 340.

The battery 340 may include a plurality of unit cells. A high voltage for providing a driving voltage (for example, 350-450 V DC) to the motor 330 that provides driving power to the wheels 390 or the HSG 320 may be stored in the battery 340.

The transmission 350 may include a multiple speed transmission such as an automatic transmission or a dual clutch transmission (DCT), and may shift to a desired gear by using hydraulic pressure depending on control of the TCU to operate engagement elements and disengagement elements. The transmission 350 may transmit driving force of the engine 310 and/or the motor 330 to the wheels 390, and may intercept power delivery between the motor 330 (or the engine 310) and the wheels 390.

According to a determination step 105, when the remaining distance $d_{res}$ is less than or equal to the maximum remaining distance $d_{max}$, the controller 305 may determine whether a remaining time (or a present remaining time) $t_{cur\_res}$ within which the hybrid vehicle will reach the traffic light near the vehicle which the hybrid vehicle will approach is less than or equal to the total signal time $t_{light}$. The remaining time $t_{cur\_res}$ may be a value obtained by dividing the remaining distance $d_{res}$ by an expected average speed V of the vehicle 300 in a road section including the traffic light near the vehicle. The expected average speed V may be the traffic situation information.

When the remaining time $t_{cur\_res}$ is equal to or less than the total signal time $t_{light}$, a process that is the method for controlling driving of the hybrid vehicle using the dynamic traffic information may proceed to a determination step 110 and a determination step 120.

According to the determination step 110, the controller 305 may determine whether a current signal or a present signal of a traffic light that the hybrid vehicle 300 will approach is a red signal and a red signal remaining time $t_{r\_res}$ is t equal to or greater than the current remaining time $t_{cur\_res}$ as shown in FIG. 3.

The process may proceed to a step 115 when the red signal remaining time $t_{r\_res}$ is less than the current remaining time $t_{cur\_res}$ and the process may proceed to a step 130 when the red signal remaining time $t_{r\_res}$ is equal to or greater than the current remaining time $t_{cur\_res}$. When the red signal remaining time $t_{r\_res}$ is less than the current remaining time $t_{cur\_res}$, the hybrid vehicle 300 may pass through the traffic light near the vehicle. When the red signal remaining time $t_{r\_res}$ is greater than or equal to the current remaining time $t_{cur\_res}$, the hybrid vehicle 300 may not pass through the traffic light near the vehicle.

When the hybrid vehicle 300 does not pass through the traffic light near the vehicle, the hybrid vehicle may be stopped in front of the traffic light near the vehicle. Therefore, when the hybrid vehicle 300 does not pass through the traffic light near the vehicle, the controller 305 may correct or adjust the transition reference value (e.g., switch reference value) between driving modes of the hybrid vehicle 300 so that the hybrid vehicle maintains to travel in the EV mode. As a result, the engine may be prevented from being unnecessarily turned on or off so that fuel economy of the hybrid vehicle 300 is improved.

According to the step 115, the controller 305 may determine a driving mode of the hybrid vehicle 300 based on a normal transition reference line (e.g., a normal transition reference value) between the EV mode and the HEV mode. The normal transition reference value may be determined based on static driving information (e.g., static traffic information), instantaneous driving demand power of the vehicle (e.g., power requested by a driver of the vehicle), and a state of charge (SOC) of the battery 340. The static traffic information may include map information including road gradient information and road curvature information, and may be stored in a navigation device of the hybrid vehicle 300.

According to the determination step 120, the controller 305 may determine whether a current signal of a traffic light that the hybrid vehicle 300 will approach is a green signal and the current remaining time $t_{cur\_res}$ exceeds a green signal remaining time $t_{g\_res}$, as shown in FIG. 4.

The process may proceed to a step 125 when the current remaining time $t_{cur\_res}$ is less than or equal to the green signal remaining time $t_{g\_res}$ and the process may proceed to the step 130 when the current remaining time $t_{cur\_res}$ exceeds the green signal remaining time $t_{g\_res}$. When the current remaining time $t_{cur\_res}$ is less than or equal to the green signal remaining time $t_{g\_res}$, the hybrid vehicle 300 may pass through the traffic light near the vehicle. When the current remaining time $t_{cur\_res}$ exceeds the green signal remaining time $t_{g\_res}$, the hybrid vehicle 300 may not pass through the traffic light near the vehicle.

According to the step 125, the controller 305 may determine a driving mode of the hybrid vehicle 300 based on the normal transition reference line (e.g., the normal transition reference value) between the EV mode and the HEV mode.

According to the step 130, the controller 305 may determine a driving mode of the hybrid vehicle 300 generated until the vehicle reaches the traffic light as the EV mode.

A transition reference value between driving modes of the vehicle 300 when the vehicle does not pass through a traffic light near the vehicle may be determined based on the instantaneous driving demand power of the vehicle (e.g., driving demand power of the vehicle over time). The driving demand power may be a value obtained by multiplying driving demand torque of the vehicle by speed of the vehicle. In another exemplary embodiment of the present disclosure, the driving demand torque and the speed of the vehicle may be determined by a test.

According to a step 135, as shown in FIG. 5 and FIG. 6, the controller 305 may determine a target speed profile of the hybrid vehicle 300 based on a current speed of the hybrid vehicle, a target speed (i.e., 0 kilometers per hour (KPH)) required when the hybrid vehicle does not pass through the traffic light near the vehicle, the traffic light information, the traffic situation information, and the position information of the hybrid vehicle. The target speed profile may mean a predicted speed value over time until the hybrid vehicle reaches the target speed.

Referring to FIG. 5, the controller 305 may calculate or determine an acceleration $a_{tgt}$ for the target speed profile based on a current speed $V_C$, a target speed $V_{tgt}$, and a deceleration time $t_4$ of the hybrid vehicle 300. The deceleration time $t_4$ may be the current remaining time $t_{cur\_res}$. The current speed $V_C$ of the hybrid vehicle 300 may be detected by a speed sensor of the hybrid vehicle 300 and may be provided to the controller 305. The speed sensor may be mounted on a wheel 390 of the vehicle.

Referring to FIG. 6, the controller 305 may calculate or determine a first target acceleration $a_{tgt\_1}$ and a second target acceleration $a_{tgt\_2}$ for the target speed profile based on the current speed $V_C$, a first target speed $V_{tgt\_1}$, a second target speed $V_{tgt2}$ that is the target speed $V_{tgt}$, a first target deceleration time $t_1$, and a second target deceleration time $t_2$ of the hybrid vehicle 300. A sum of the first target deceleration time $t_1$ and the second target deceleration time $t_2$ may be the current remaining time $t_{cur\_res}$.

According to a step 140, the controller 305 may determine or predict the driving demand power of the hybrid vehicle 300 based on the target speed profile and a driving load of the hybrid vehicle. For example, the controller 305 may calculate the driving demand power by multiplying the target speed profile by the driving load.

The controller 305 may determine or calculate the driving load using the static traffic information and a longitudinal dynamics model (or a lateral dynamics model) of the vehicle.

For example, the controller 305 may calculate the driving load $F_R$ using the following equations according to a longitudinal driving load model of the vehicle.

The driving load=a load due to air resistance+a load due to rolling resistance+a load due to gradient resistance $$F_R = \tfrac{1}{2}\rho C_d A V^2 + mg(\mu \cdot \cos\beta + \sin\beta)$$

In the above equation, the $\rho$ may be atmospheric air density (kg/m$^3$), the $C_d$ may be an air resistance coefficient and may have a negative sign, the A may be a frontal area of the hybrid vehicle (m$^2$), the V may be a speed of the hybrid vehicle, the m may be weight of the hybrid vehicle, the g may be acceleration of gravity, the $\mu$ may be a resistance coefficient, and the $\beta$ may be an inclination angle or a slope of a road on which the hybrid vehicle travels.

According to a correction step 145, as shown in FIG. 7, the controller 305 may correct the transition reference value between the driving modes of the hybrid vehicle 300 as a value greater than the transition reference value between the driving modes determined based on the driving demand power. In particular, the controller 305 may drive the hybrid vehicle 300 in the EV mode by adjusting the transition reference value upward. Thus, a transition from the EV mode to the HEV mode may be prevented and the engine 310 may be prevented from being turned on or off so that fuel consumption of the hybrid vehicle 300 is reduced.

In another exemplary embodiment of the correction step 145, as shown in FIG. 8, the controller 305 may adjust or correct the corrected transition reference value based on the SOC of the battery 340 supplying electric power to the driving motor 330 of the hybrid vehicle 300.

Referring to FIG. 8, the adjustment value of the transition reference value when the SOC of the battery 340 is equal to or greater than a reference value (e.g., 80%) may be greater than the adjustment value of the transition reference value when the SOC of the battery 340 is less than the reference value.

As described above, the exemplary embodiment of the present disclosure may determine whether the vehicle passes through the traffic light near the vehicle using the traffic light information (e.g., position information of the traffic light), the traffic situation information (e.g., the road congestion information, an average speed of a vehicle in a congestion area of the road, the number of vehicles in each road section, or an average speed of a vehicle in each road section), and current driving information (e.g., vehicle position information) of the vehicle, and may determine the driving mode of the vehicle and may correct a transition reference value between the driving modes based on whether the vehicle passes through the traffic light near the vehicle. In particular, the exemplary embodiment of the present disclosure may determine the driving mode of the vehicle in advance using the dynamic traffic information, and may adjust the transition reference value between the driving modes based on the determined driving mode.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and equivalent exemplary embodiments are possible from the present disclosure. Accordingly, the actual technical protection scope of the present disclosure must be determined by the spirit of the appended claims.

What is claimed is:

1. A method for controlling driving of a hybrid vehicle using dynamic traffic information, the method comprising:
   determining, by a controller, whether the hybrid vehicle passes through a traffic light based on the dynamic traffic information including traffic light information and traffic situation information; and
   determining, by the controller, a driving mode of the hybrid vehicle that is used on a road disposed between the hybrid vehicle and the traffic light based on whether the hybrid vehicle passes through the traffic light,
   wherein determining whether the hybrid vehicle passes through the traffic light comprises,
   determining, by the controller, whether a current signal of the traffic light is a red signal and a red signal remaining time is greater than or equal to a remaining time in which the hybrid vehicle reaches the traffic light,
   wherein the controller determines the red signal remaining time and the remaining time based on the traffic light information, the traffic situation information, and position information of the hybrid vehicle, and
   wherein when the red signal remaining time is greater than or equal to the remaining time, it is determined that the hybrid vehicle does not pass through the traffic light.

2. The method of claim 1, wherein determining the driving mode of the hybrid vehicle comprises:
   correcting, by the controller, a transition reference value between possible driving modes of the hybrid vehicle so that the hybrid vehicle maintains to travel in an electric vehicle mode when it is determined that the hybrid vehicle does not pass through the traffic light.

3. The method of claim 1, wherein determining the driving mode of the hybrid vehicle comprises:
   determining, by the controller, the driving mode of the hybrid vehicle based on a transition reference value between an electric vehicle mode and a hybrid electric vehicle mode when it is determined that the hybrid vehicle passes through the traffic light, wherein the transition reference value is determined based on static traffic information, driving demand power of the hybrid vehicle, and a state of charge of a battery included in the hybrid vehicle.

4. The method of claim 2, wherein correcting the transition reference value between the possible driving modes of the hybrid vehicle so that the hybrid vehicle maintains to travel in the electric vehicle mode comprises:
   determining, by the controller, a target speed profile of the hybrid vehicle based on a current speed of the hybrid vehicle, a target speed required when the hybrid vehicle does not pass through the traffic light, the traffic light information, the traffic situation information, and position information of the hybrid vehicle;
   determining, by the controller, the driving demand power of the hybrid vehicle based on the target speed profile and a driving load of the hybrid vehicle; and
   correcting, by the controller, the transition reference value between the possible driving modes of the hybrid vehicle as a value greater than the transition reference value between the possible driving modes determined based on the driving demand power.

5. The method of claim 4, wherein correcting the transition reference value between the possible driving modes of the hybrid vehicle so that the hybrid vehicle maintains to travel in the electric vehicle mode further comprises:
   adjusting, by the controller, the corrected transition reference value based on a state of charge of a battery supplying electric power to a driving motor of the hybrid vehicle.

6. The method of claim 5, wherein the adjusted value of the transition reference value when the state of charge of the battery is equal to or greater than a reference value is greater than the adjusted value of the transition reference value when the state of charge of the battery is less than the reference value.

7. The method of claim 1, wherein the traffic light information includes a red signal time and a green signal time, and the traffic situation information includes an expected average speed of the hybrid vehicle in a road section including the traffic light.

8. The method of claim 1, wherein determining whether the hybrid vehicle passes through the traffic light comprises:
   determining, by the controller, whether a current signal of the traffic light is a green signal and a remaining time in which the hybrid vehicle reaches the traffic light exceeds a green signal remaining time,
   wherein the controller determines the green signal remaining time and the remaining time based on the traffic light information, the traffic situation information, and position information of the hybrid vehicle, and
   wherein when the remaining time is greater than or equal to the green signal remaining time, it is determined that the hybrid vehicle does not pass through the traffic light.

9. A non-transitory computer readable medium containing program instructions executed by a processor, the computer readable medium comprising:
   program instructions that determine whether a hybrid vehicle passes through a traffic light based on dynamic traffic information including traffic light information and traffic situation information; and
   program instructions that determine a driving mode of the hybrid vehicle that is used on a road disposed between the hybrid vehicle and the traffic light based on whether the hybrid vehicle passes through the traffic light, wherein the program instructions that determine whether the hybrid vehicle passes through the traffic light comprise, program instructions that determine whether a current signal of the traffic light is a red signal and a red signal remaining time is greater than or equal to a remaining time in which the hybrid vehicle reaches the traffic light, wherein the processor determines the red signal remaining time and the remaining time based on the traffic light information, the traffic situation information, and position information of the hybrid vehicle, and wherein when the red signal remaining time is greater than or equal to the remaining time, it is determined that the hybrid vehicle does not pass through the traffic light.

* * * * *